(12) United States Patent
Wang et al.

(10) Patent No.: US 8,248,790 B2
(45) Date of Patent: Aug. 21, 2012

(54) ELECTRONIC DEVICE

(75) Inventors: Wei-Jun Wang, Shenzhen (CN); Zi-Ming Tang, Shenzhen (CN)

(73) Assignees: Hong Fu Jin Precision Industry Co., Ltd., Shenzhen, Guangdong Province (TW); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 315 days.

(21) Appl. No.: 12/612,080

(22) Filed: Nov. 4, 2009

(65) Prior Publication Data

US 2011/0007456 A1    Jan. 13, 2011

(30) Foreign Application Priority Data

Jul. 13, 2009   (CN) .......................... 2009 1 0304309

(51) Int. Cl.
  *H05K 7/12*   (2006.01)
(52) U.S. Cl. ................. 361/679.58; 361/727; 455/575.4
(58) Field of Classification Search ............ 361/679.58, 361/679.01, 679.08, 679.26, 679.55, 679.56, 361/679.3, 679.21, 679.02; 455/575.1–575.4; 379/433.11–433.13
See application file for complete search history.

(56) References Cited

U.S. PATENT DOCUMENTS

| | | | | |
|---|---|---|---|---|
| 6,407,912 B1* | 6/2002 | Chen et al. | ............... | 361/679.58 |
| 7,379,763 B2* | 5/2008 | Wu | ............... | 455/575.4 |
| 7,822,448 B2* | 10/2010 | Lin et al. | ............... | 455/575.8 |
| 8,010,170 B2* | 8/2011 | Shi et al. | ............... | 455/575.1 |

\* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

An electronic device capable of sliding open and closed includes a first cover connected to a second cover by two locking assemblies. The first cover is capable of sliding relative to the second cover. The first cover forms two latch portions and two guide portions. The second cover has a sidewall and defines a receptacle. Each locking assembly includes a control, a resilient member, and a guide member. The control mounted on the second cover partially extends into the receptacle of the second cover. The resilient member, received in the second cover, has two ends respectively resisting the second cover and a latch portion of the first cover. The guide member passes through the resilient member, a latch portion, and a guide portion.

17 Claims, 6 Drawing Sheets

ELECTRONIC DEVICE

BACKGROUND

1. Technical Field

The present disclosure generally relates to electronic devices, and particularly, to an electronic device capable of sliding open and closed.

2. Description of Related Art

Electronic devices capable of sliding open and closed, for example, sliding mobile phones, are popular. Electronic device of this type usually have one housing which slides over another housing, thereby opening or closing the electronic device.

Opening a typical electronic devices of sliding type may be manual, semi-automatic, or automatic. When opening or closing the manual electronic device of sliding type, force must be consistently provided to move the first housing to a predetermined position relative to the other housing, which can be difficult. When opening or closing the semi-automatic electronic device of sliding type, force needs to be initially provided on one housing which is then impelled by a resilient member to the predetermined position, an easier operation, but it still requires application of the external force. The automatic electronic device of sliding type normally includes a manual control and a control circuit. Activation of the control switches the control circuit on, whereby one housing slides to a predetermined position relative to the other housing automatically, making it the simplest of the three operations. However, a control circuit is required and a plurality of elements in the device must cooperate with each other with considerable precision.

Therefore, there is room for improvement within the art.

BRIEF DESCRIPTION OF THE DRAWINGS

The components in the drawings are not necessarily drawn to scale, the emphasis instead being placed upon clearly illustrating the principles of the present slide mechanism. Moreover, in the drawings, like reference numerals designate corresponding parts throughout the several views, and all the views are schematic.

DETAILED DESCRIPTION

Figure 1:
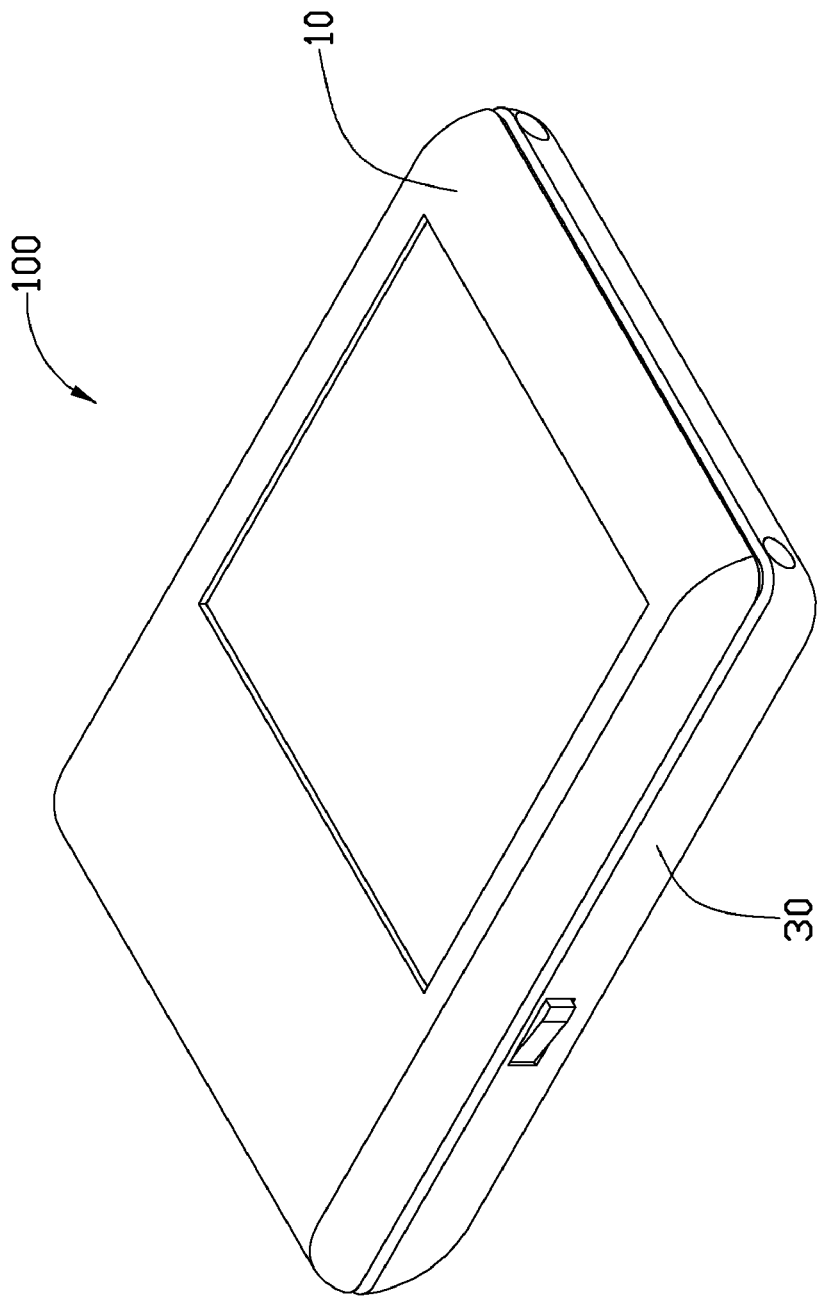
FIG. 1 is an assembled, isometric view of an embodiment of an electronic device including a first cover, a second cover, and a control.
Figure 2:
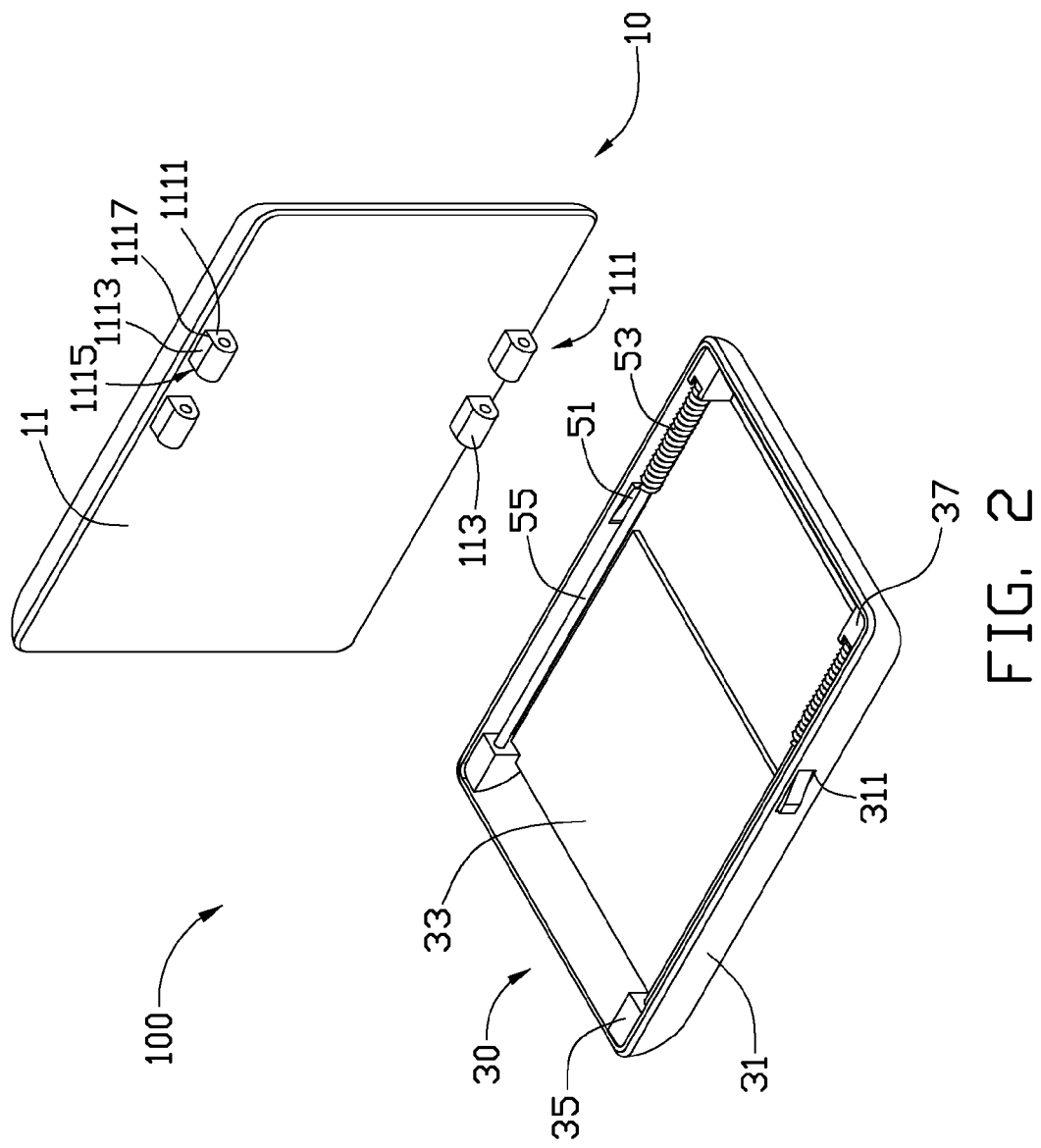
FIG. 2 is a partially exploded, isometric view of the electronic device of FIG. 1.

Referring to FIG. 1 and FIG. 2, one embodiment of an electronic device 100 capable of sliding open and closed includes a first cover 10, a second cover 30 slidably coupling with the first cover 10, and two locking assemblies 50 (see FIG. 3) connecting the first cover 10 and the second cover 30.

The first cover 10 has a coupling surface 11 facing the second cover 30. Two latch portions 111 and two guide portions 113 are formed on the coupling surface 11. The first cover 10 has two opposite edges, with one latch portion 111 and one guide portion 113 formed adjacent to each. Each latch portion 111 and each guide portion 113 define a through hole. Each latch portion 111 has a resisting surface 1111, a side surface 1113, a locking surface 1115 opposite to the resisting surface 1111, and an edge 1117 formed at the joint of the resisting surface 1111 and the side surface 1113.

Figure 3:
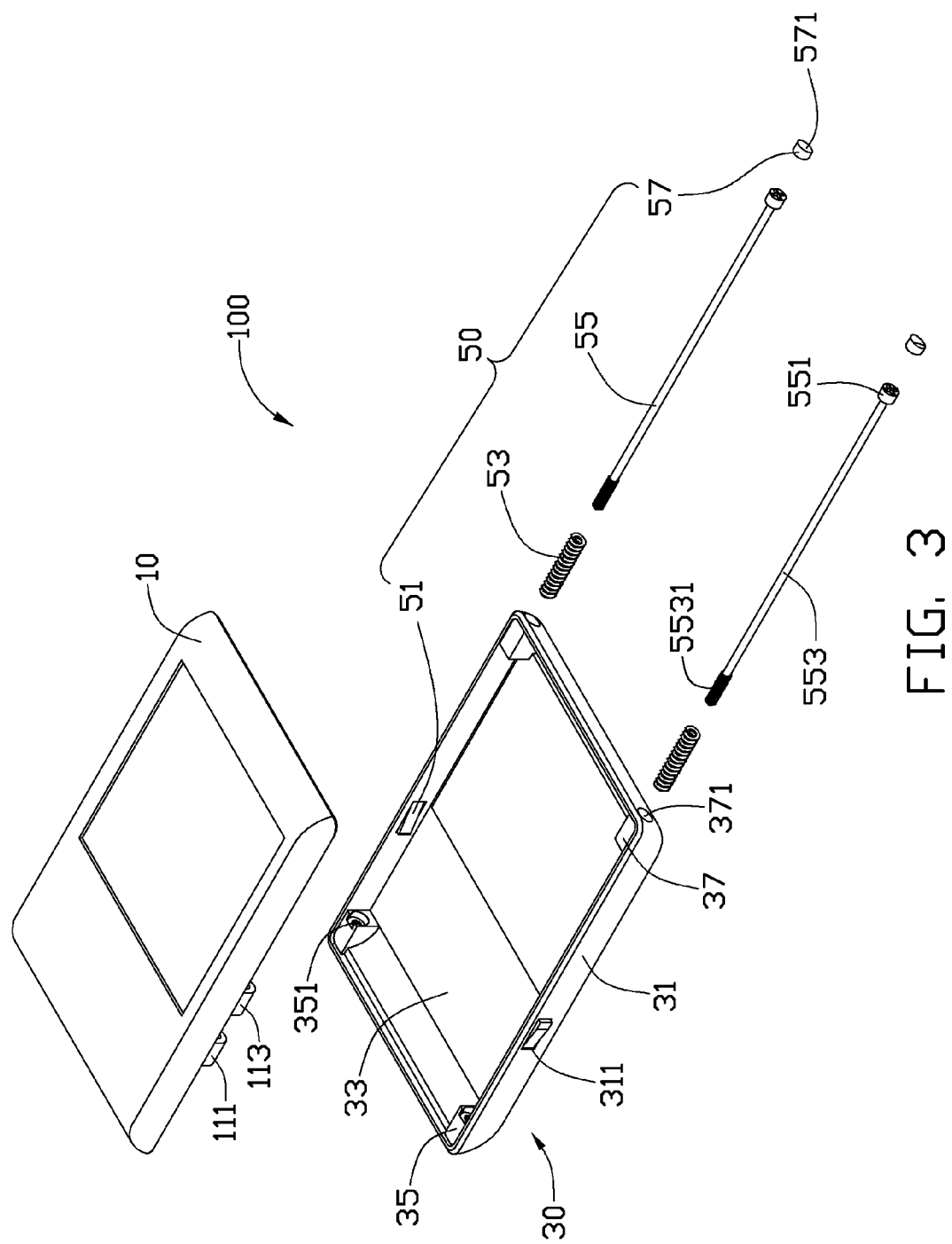
FIG. 3 is an exploded, isometric view of the electronic device of FIG. 1.

Referring to FIG. 3, the second cover 30 includes a sidewall 31, defining a receptacle 33, and forming two limiting protrusions 35 and two orienting protrusions 37. The sidewall 31 is continuous and forms a circle. The sidewall 31 defines two receiving holes 311 in opposite portions of the sidewall 31. The receptacle 33 is encircled by the sidewall 31. Two limiting protrusions 35 are formed in the receptacle 33 and at one end of the second cover 30, and each limiting protrusion 35 defines a screw hole 351. Two orienting protrusions 37 are formed in the receptacle 33 and at the other end of the second cover 30, and each orienting protrusion 37 defines a stepped hole 371 communicating the receptacle 33 with the outside of the second cover 30. Each limiting protrusion 35 is opposite to each orienting protrusion 37.

Each locking assembly 50 includes a control 51, a resilient member 53, a guide member 55, and a stopper 57. In the illustrated embodiments, the control 51 is a button for pressing.

Figure 4:
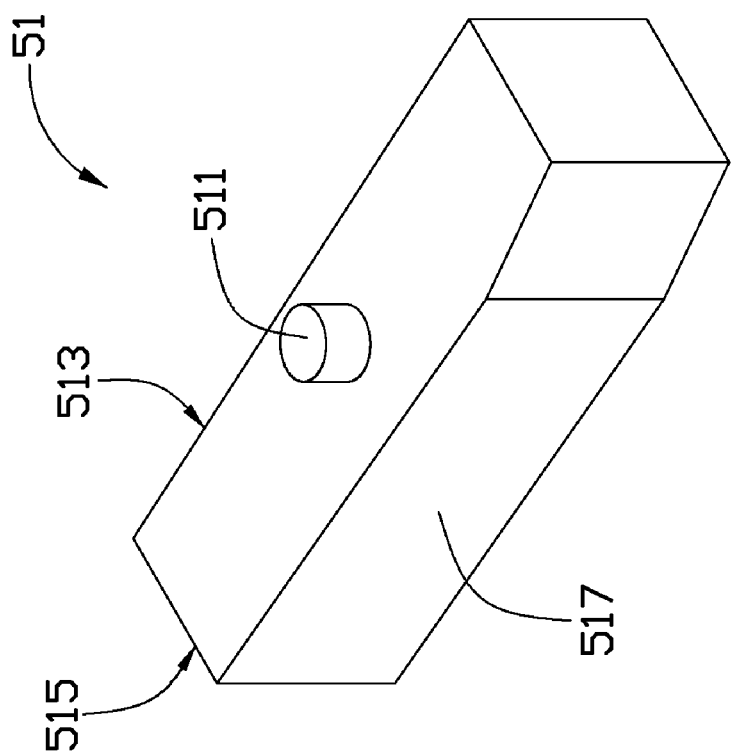
FIG. 4 is an isometric view of the control of the electronic device of FIG. 1.

Also referring to FIG. 4, the control 51 is rotatably mounted on the second cover 30. The control 51 forms two pivot shafts 511 extending from two opposite sides. The control 51 has a contact surface 513, a blocking surface 515, and a pressure surface 517. The contact surface 513, the blocking surface 515 and the pressure surface 517 are adjacent to the two sides on which the two pivot shafts 511 are formed. The control 51 connects to the second cover 30 via two pivot shafts 511. The contact surface 513 angles relative to the sidewall 31 of the second cover 30, such that the control 51 partially extends into the receptacle 33 of the second cover 30 and is partially exposed out of the second cover 30. The pressure surface 517 faces the outside of the second cover 30. In this embodiment, the control 51 may include an elastic plastic material and molded together with the second cover 30. The control 51 may be also made of other elastic materials, such as, rubber, and resin, for example.

In this embodiment, the resilient member 53 is a compression spring. The resilient member 53 is disposed in the receptacle 33 of the second cover 30 and extends in a direction in which the first cover 10 slides relative to the second cover 30. The guide member 55 is a screw which includes a head portion 551 and a screw bar 553 connecting with each other, the guide member 55 is fixed on the second cover 30. The screw bar 553 defines a threaded portion 5531 at the distal end. The stopper 57 has an end surface 571 which has a same radian as an out surface of the sidewall 31, such that when assembled in the sidewall 31, the second cover 30 may has a smooth out surface.

Figure 5:
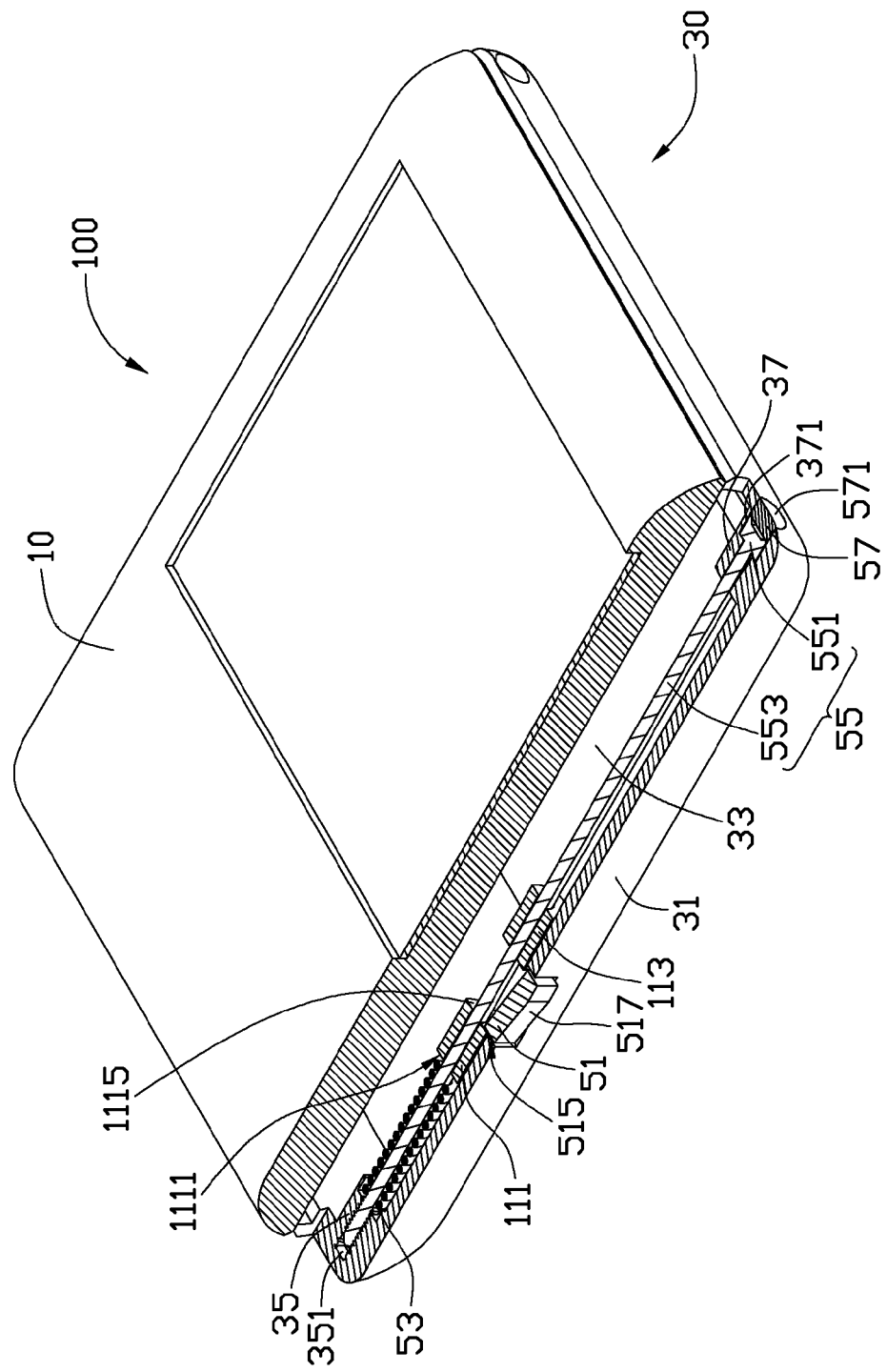
FIG. 5 is a cut away view of the electronic device of FIG. 1, showing the first cover closed relative to a second cover.

Referring to FIG. 5, in assembly of the electronic device 100, the first cover 10 is covered on the second cover 30. The latch portions 111, the guide portions 113, and the resilient members 53 of the locking assemblies 50 are received in the receptacle 33 of the second cover 30. The guide member 55 of the locking assemblies 50 are plugged through the orienting protrusions 37, the guide portions 113 and the latch portions 111 of the first cover 10, and the resilient members 53 of the locking assemblies 50. Then the threaded portion 5531 of each guide member 55 is engaged with the screw hole 351 of one corresponding limiting protrusion 35. The head portion 551 of each guide member 55 is received in the stepped hole 371 of one corresponding orienting protrusion 37. The stoppers 57 are plugged into the stepped hole 371 to make the out surface of the electronic device 100 being smooth. Two opposite ends of each resilient member 53 resist a limiting protrusion 35 and the resisting surface 1111 of each latch portion 111.

Referring to FIGS. 3 through 5, when the first cover 10 is closed relative to the second cover 30, the latch portions 111 are blocked by the controls 51. The locking surfaces 1115 of the latch portions 111 keep the portions of the controls 51 from partially extending into the receptacle 33, that is, the locking surfaces 1115 of the latch portions 111 resist the blocking surfaces 515 of the controls 51. The resilient members 53 are compressed and elastic potential energy generated therein.

Figure 6:
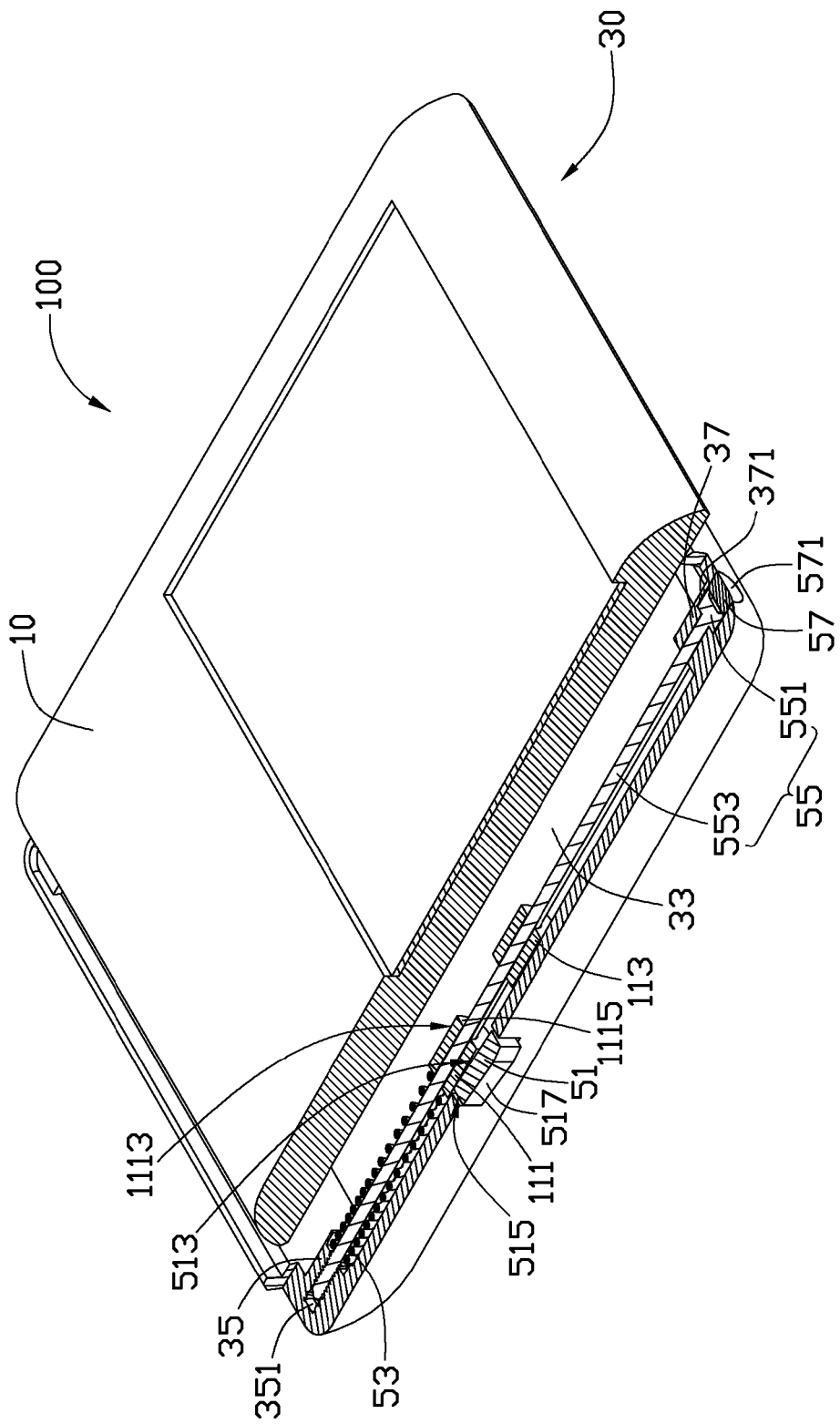
FIG. 6 is similar to FIG. 5, but showing the first cover opened relative to the second cover.

Referring to FIG. 3, FIG. 4 and FIG. 6, when the first cover 10 is to be opened relative to the second cover 30, pressure applied on the pressure surface 517 of each control 51 rotates the controls 51 around the pivot shafts 511 and out of the receptacle 33. The latch portions 111 of the first cover 10 are released by the controls 51 and slide along the guide members 55 driven by the elastic force of the resilient members 35, whereby the first cover 10 is driven by the resilient members 35 and slides relative to the second cover 30 to a predetermined position.

Since the controls 51 are molded together with the second cover 30 of elastic materials, when the controls 51 rotate relative to the second cover 30, the pivot shafts 511 are twisted and deformed, and the controls 51 have a tendency to rotate in an opposite direction. Further, once pressure applied on the controls 51 is removed, the controls 51 rotate in the opposite direction automatically, extending into the receptacle 33 of the second cover 30 again.

Referring to FIGS. 3 through 6, when the first cover 10 is to be closed relative to the second cover 30, an elastic force causes the first cover 10 to slide closed relative to the second cover 30. When the first cover 10 slides along the guide members 55 of the locking assemblies 50 for a distance, the edge 1117 of each latch portion 111 resists the contact surface 513 of one corresponding control 51. Continuing to slide, the edge 1117 and the side surface 1113 of each latch portion 111 may press the contact surface 513 of each control 51 in turn, and the controls 51 rotate around the pivot shafts 511. The pivot shafts 511 of the controls 51 are twisted and deformed. When the latch portions 111 slides to pass away from the controls 51, the controls 51 rotate around the pivot shafts 511 in an opposite direction and partially extend into the receptacle 33 of the second cover 30. The blocking surfaces 515 resist the locking surfaces 1115 of the latch portions 111 on the first cover 10. Once no longer to provide force on the first cover 10 the latch portions 111 impelled by the resilient members 53 tightly resist the blocking surfaces 515 of the controls 51. During the sliding of the first cover 10, the resilient members 55 of the locking assemblies 50 are gradually compressed and an elastic potential energy is generated in the resilient members 53 again.

In the electronic device 100, when the controls 51 block the latch portions 111 of the first cover 10, the first cover 10 is securely closed relative to the second cover 30. When pressure on the controls 51 releases the latch portions 111, the first cover 10 slides to the predetermined position relative to the second cover 30 driven by the resilient members 53, such that no pressure need be applied on the first cover 10 to open the first cover 10 relative to the second cover 30.

In the electronic device 100, since the controls 51 are molded together with the second cover 30 of elastic material, when force applied thereon is removed, the deformation of the twisted pivot shafts 511 may gradually disappear and the controls 51 rotate together with the pivot shafts 511. Therefore, the controls 51 may lock with the first cover 10 without other assistant members. The electronic device 100 with a simple structure is possible and easily assembled or disassembled.

In the electronic device 100, the guide members 55 of the locking assemblies 50 pass through the resilient members 53, and the latch portions 111 and the guide portions 113 of the first cover 10, such that the first cover 10 can slide relative to the second cover 30 precisely. The guide portions 113 prevent moved of the guide members 55 of the locking assemblies 50 in the receptacle 33 of the second cover 30.

There are two locking assemblies 50, with the number of the latch portions 111 and other cooperating corresponding thereto, such that force applied on the first cover 10 and the second cover 30 is balanced.

In alternative embodiments, the controls 51 may be not molded together with the second cover 30, with the pivot shafts 511 alternately fixed on the second cover 30. The pivot shafts 511 of the controls 51 may pass through the controls 51, being of non-elastic materials. Correspondingly, two added torsion springs sleeve on the pivot shafts 511, with one end of each torsion spring fixed on the second cover 30 and the other end fixed on a control 51. The resilient members 53 may be tensile springs with one end of each fixed on a guide portion 113 and the other on an orienting protrusion 37. The guide members 55 may be uncovered bars with no fasters in the orienting protrusions 37, received in the limiting protrusions 35, and then in the second cover 30 by the stoppers 57. The guide members 55 and the guide portions 113 may be omitted, with, for example, one end of each resilient member 53 fixed on the second cover 30, and the other end fixed on a latch portion 111. One of the latch portions 111 may be omitted, wherein one locking assembly 50 is correspondingly omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device capable of sliding open and closed, comprising;
   a first cover forming at least one latch portion;
   a second cover coupled to the first cover, wherein the first cover is capable of sliding relative to the second cover;
   at least one control disposed on the second cover and rotatable relative to the second cover, wherein the at least one control is capable of blocking the at least one latch portion of the first cover; and
   at least one resilient member disposed between the first cover and the second cover to slide the first cover relative to the second cover
   wherein the second cover defines a receptacle in which the at least one latch portion of the first cover is received, and into which at least part of the at least one control extends to block the at least one latch portion; the at least one control comprises a contact surface and a blocking surface connecting therewith, wherein the contact surface faces the receptacle of the second cover and angles relative to a sidewall of the second cover, such that the contact surface and the blocking surface are partially received in the receptacle of the second cover.

2. The electronic device of claim 1, wherein the at least one resilient member extends along an orientation in which the first cover slides relative to the second cover.

3. The electronic device of claim 2, wherein the at least one resilient member comprises one end resisting on the second cover and the other end resisting on the at least one latch portion of the first cover.

4. The electronic device of claim 1, wherein the at least one control forms two pivot shafts, whereby when the at least one control rotates around the pivot shafts in a first direction, torque is generated in response to which the at least one control then rotates around the pivot shafts in an opposite direction.

5. The electronic device of claim 4, wherein the pivot shafts are fixed on the second cover and comprise elastic material.

6. The electronic device of claim 5, wherein the at least one control is molded together with the second cover.

7. The electronic device of claim 1 further comprising at least one guide member fixed on the second cover, passing through the at least one resilient member and the at least one latch portion of the first cover.

8. The electronic device of claim 7, wherein the first cover further forms at least one guide portion, through which the at least one guide member passes.

9. The electronic device of claim 7, wherein the second cover forms at least one limiting protrusion and at least one orienting protrusion in the receptacle, and the at least one limiting protrusion and the at least one orienting protrusion are formed respectively adjacent to two ends of the second cover, the two ends of the at least one guide member engaging the at least one limiting protrusion and the at least one orienting protrusion.

10. The electronic device of claim 9, wherein the number of controls, latch portions, resilient members, guide members, and guide portions is two.

11. An electronic device capable of sliding open and closed, comprising:
a first cover forming at least one latch portion;
a second cover slidably coupled to the first cover; and
at least one locking assembly comprising a control disposed on the second cover and a resilient member, wherein the resilient member applies elastic force on the first cover, and the control of the at least one locking assembly rotates to block or release the at least one latch portion of the first cover;
wherein the second cover defines a receptacle in which the at least one latch portion of the first cover is received, and into which at least part of the control extends to block the at least one latch portion; the control comprises a contact surface and a blocking surface connecting therewith, wherein the contact surface faces the receptacle of the second cover and angles relative to a sidewall of the second cover, such that the contact surface and the blocking surface are partially received in the receptacle of the second cover;
wherein when the control of the at least one locking assembly blocks the at least one latch portion of the first cover, the resilient member is deformed; and when the control of the at least one locking assembly releases the at least one latch portion of the first cover, the elastic force of the resilient member applied on the at least one latch portion drives the first cover to slide relative to the second cover.

12. The electronic device of claim 11, wherein one end of the resilient member of the at least one locking assembly resists the second cover, and the other end of the resilient member resists the at least one latch portion of the first cover.

13. The electronic device of claim 12, wherein the at least one locking assembly further comprising a guide member fixed on the second cover and passing through the at least one latch portion and the resilient member.

14. The electronic device of claim 13, wherein the first cover further comprises at least one guide portion through which the guide member of the at least one locking assembly passes.

15. The electronic device of claim 11, wherein the control of the at least one locking assembly forms two pivot shafts connected with the second cover.

16. The electronic device of claim 15, wherein the pivot shafts are fixed on the second cover and comprise elastic material.

17. The electronic device of claim 16, wherein the control of the at least one locking assembly is molded together with the second cover.

* * * * *